United States Patent [19]
Beisel

[11] Patent Number: 5,152,234
[45] Date of Patent: Oct. 6, 1992

[54] CHAFFY SEED DRILL WITH TORSIONALLY RESPONSIVE TRANSVERSE FRAME

[76] Inventor: Victor A. Beisel, R.R. 1, Box 26, Fargo, Okla. 73840

[21] Appl. No.: 489,679

[22] Filed: Mar. 7, 1990

[51] Int. Cl.⁵ ............................................. A01C 7/12
[52] U.S. Cl. ........................................ 111/74; 111/52; 111/130; 111/178
[58] Field of Search ............... 111/130, 128, 74, 178, 111/52, 198; 172/677, 776, 669, 310

[56] References Cited

U.S. PATENT DOCUMENTS

| | | | |
|---|---|---|---|
| 26,448 | 12/1859 | Singeltary | 111/74 |
| 320,279 | 6/1885 | Peabody | 111/74 X |
| 347,545 | 8/1886 | Wimpee | 111/74 X |
| 368,495 | 8/1887 | Schroeder | 111/74 X |
| 508,123 | 11/1893 | Sharp | 111/74 X |
| 518,979 | 5/1894 | Wilson | 111/74 X |
| 1,522,074 | 1/1925 | Olson | 111/198 |
| 2,684,786 | 7/1954 | Silver et al. | 111/74 X |
| 2,902,954 | 9/1959 | Stilwell | 111/52 |
| 3,774,557 | 11/1973 | Esmay et al. | 111/198 X |

FOREIGN PATENT DOCUMENTS

| | | | |
|---|---|---|---|
| 42860 | 12/1973 | Australia | 111/74 |
| 516960 | 1/1940 | United Kingdom | 111/178 |

Primary Examiner—Danton D. DeMille
Attorney, Agent, or Firm—Fleit, Jacobson, Cohn, Price, Holman & Stern

[57] ABSTRACT

A seed drill is provided including opposite side ground engaging support wheels journaled from opposite ends of a transverse beam of the seed drill. The longitudinal center of the beam includes a horizontal, forwardly directed towing tongue and the opposite ends of the beams include forwardly and upwardly inclined support arms from whose opposite ends the remote ends of a pair of axially aligned and spaced apart drums are journaled, the adjacent ends of the drums being journaled from the upper portion of upstanding support structure carried by the tongue a spaced distance forward of the beam. The ground engagable wheels are drivingly connected to the drums and the latter include axially spaced circumferentially extending rows of openings through which seeds may be dispensed and longitudinally spaced portions of the beam have drag-type link chain sections anchored relative thereto in registry with the axially spaced circumferential rows of openings formed in the drums.

14 Claims, 2 Drawing Sheets

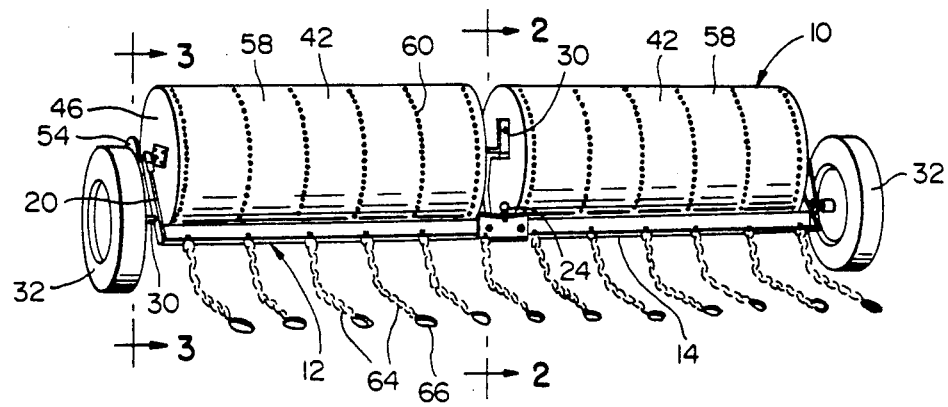
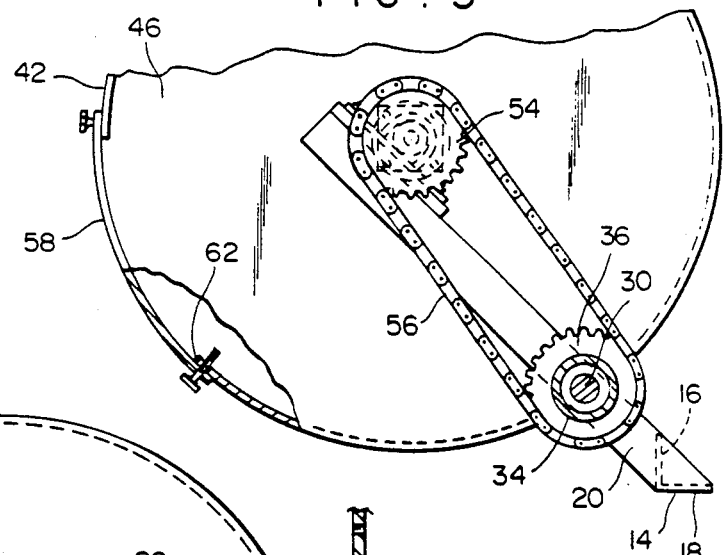
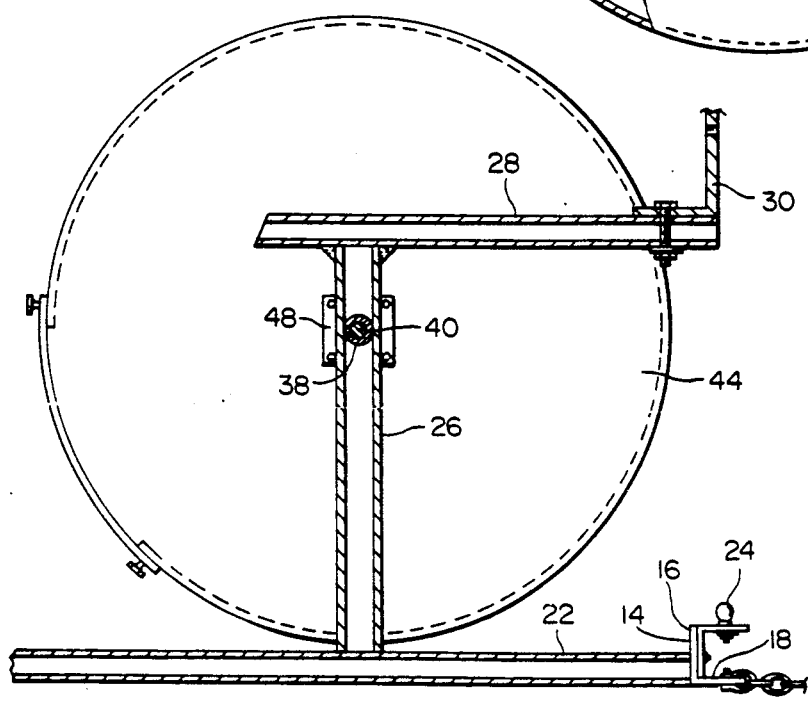

CHAFFY SEED DRILL WITH TORSIONALLY RESPONSIVE TRANSVERSE FRAME

BACKGROUND OF THE INVENTION

1. Field of the Invention

This invention relates to a seed drill specifically designed for operation over rough ground and to be trailed behind low to medium powered draft vehicles.

2. Description of Related Art

Various different forms of seed drills (grass seeders) heretofore have been provided, but most have been designed primarily for use on smooth ground.

In recent years, however, attempts have been made to utilize these previously known forms of seeders on rough ground (in part for soil erosion control) and users of such previously known forms of grass seeders have found that frequent repairs to the seeders must be made as a result of breakage due to usage over rough ground.

Some manufacturers of seeders have, therefore, developed seeders which are more strongly constructed and braced to withstand the considerable operational stresses which occur when operating a seeder over rough ground.

However, it has recently become apparent that more heavily constructed and braced seeders result in seeders which are extremely stiff and therefore transmit operational shocks throughout and still incur breakage and other failures due to operation over rough ground. Also, more heavily constructed and braced seeders require larger and more powerful draft vehicles which return results in considerably higher fuel costs and draft vehicle maintenance costs.

Also, prior art seed drills for chaffy seeds utilize a picker wheel or brush wheel to replace the standard grain feed cup to pull material (seed) from a grain box rather than rely upon gravity for feeding grain from the box. Also, additional agitation is provided to many grain boxes by paddle wheels or augers to prevent bridging of the grain. Also, large feed cups and down spouts are required and chaffy seed requires extensive processing and conditioning for usage in a seed drill.

The instant invention, however, utilizes a simple rotating storage drum for the chaffy seed and the drum provides for both agitation and proper metering with a simple low cost structure inherently capable of receiving therein larger quantities of chaffy seed than would be possible conventional grain boxes.

SUMMARY OF THE INVENTION

The seed drill of the instant invention has been designed primarily for use over rough ground and also for use with chaffy seeds.

The seed drill, as opposed to being more heavily constructed and braced, has been more lightly constructed than usual and further has been constructed to include no ground engaging rigid components for effecting the desired seed planting operation.

Lengths of link chain are used to drag over the ground surface to loosen the surface layer along parallel paths in which seeds to be planted are deposited and the rear ends of the lengths of link chain are equipped with oversized loops designed specifically to gather the loosened top layer of soil into a narrow band of soil disposed over the seed rows.

The main object of this invention is to provide a chaffy seed drill which will contain a large amount of chaffy seeds and yet which will be of light weight construction and constructed in a manner such that the shocks encountered during operation of the seed drill over rough ground will be appreciably absorb by the frame of the seed drill before being transmitted to those portions of the seed drill which support the weight of the larger supply of chaffy seed carried by the seed drill.

Another object of this invention is to provide a chaffy seed drill equipped with rigidly mounted ground engaging support wheels to eliminate the costs of the manufacture of vertically shiftable wheel supports and the attendant maintenance problems associated therewith.

Another very important object of this invention is to provide a chaffy seed drill of such light weight construction to thereby enable even a low powered, four-wheel ATV to used as a prime mover for the seed drill.

Another object of this invention is to provide a chaffy seed drill operative to perform a seeding operation without the use of rigid ground engaging implement portions.

Still another very important object of this invention is to provide a chaffy seed drill of such light weight construction and large seed capacity such that the weight of a full load of seeds comprises a large percentage of the gross weight of the seed drill.

Yet another object of this invention is to provide a chaffy seed drill utilizing an elevated rotatable horizontal drum for containing and dispensing seed and with the frame component of the seed drill being constructed in a manner to rigidly support opposite side wheels of the seeder in a manner such that a major portion of the impact of the wheels with ground obstructions is not transmitted directly to the rotatable drum.

Still another object of this invention is to provide an apparatus which may be utilized at a low cost to propagate species of chaffy seeds which are otherwise extremely difficult to propagate and through the utilization of a seed drill particularly well equipped for successfully metering unprocessed chaffy seed to thereby allow a rancher, conservationist or researcher to harvest and expand a small seeding of a new difficult plant release without professional knowledge and independent of high cost of processing equipment otherwise required to enable successful metering of chaffy seed from conventional grain boxes.

A final object of this invention to be specifically enumerated herein is to provide a seed drill in accordance with the preceding objects and which will conform to conventional forms of manufacture, be of simple construction and trouble free in operation so as to provide a device that will be economically feasible, long-lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the seed drill of the instant invention;

FIG. 2 is an enlarged fragmentary vertical sectional view taken substantially upon the plane indicated by the section line 2—2 of FIG. 1;

FIG. 3 is an enlarged fragmentary vertical sectional view taken substantially upon the plane indicated by the section line 3—3 of FIG. 1;

DESCRIPTION OF THE PREFERRED EMBODIMENT

Figure 4:
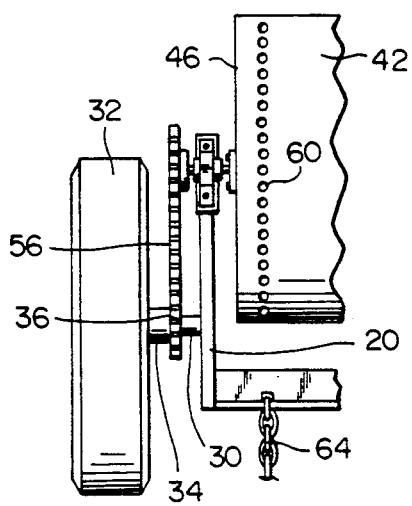
FIG. 4 is an enlarged fragmentary rear elevational view of the left end of the seed drill.

Referring now more specifically to the drawings the numeral 10 generally designates the wheeled agricultural implement comprising the seed drill of the instant invention.

The drill 10 includes a frame referred to in general by the reference numeral 12 incorporating an elongated, horizontal, transverse beam 14 in the form of an angle member including an upstanding forward flange 16 and a rear horizontal flange 18.

The opposite ends of the beam 14 include forwardly and upwardly inclined arms 20 disposed at a generally 45° angle and the longitudinal mid-portion of the beam 14 includes a horizontally and forwardly projecting tongue 22 whose forward end (not shown) is equipped with any suitable type of hitch means (not shown) for removable coupling to a prime mover or draft vehicle (not shown). In addition, the longitudinal mid-portion of the beam 14 includes a towing hitch 24 to which a trailer vehicle (not shown) may be removably coupled.

The tongue 22 includes an upright support structure 26 supported therefrom a spaced distance forward of the beam 14 and the upper terminal end of the upright support structure includes a horizontally rearwardly projecting support arm 28 having a mounting bracket 30 disposed thereon from which a rearwardly facing light reflective warning panel (not shown) may be supported, if desired.

The lower end portions of the arms 20 include outwardly projecting stub axles 30 rigidly supported therefrom and opposite side ground engaging support wheels 32 are journaled from the stub axles 30 and include hub portions 34 from which drive sprockets 36 are mounted.

The upper end portion of the vertical support structure 26 includes a reinforcing sleeve 38 rigidly supported therefrom and extending therethrough and the sleeve 38 has an axle shaft 40 extending therethrough and rigidly supported therefrom. A pair of axially spaced and aligned horizontal drums 42 are provided and include adjacent end walls 44 and remote end walls 46. The adjacent end walls 44 include self centering bearing assemblies 48 supported therefrom journaled from adjacent ends of the shaft 40 and the remote end walls 46 of the drums 42 include stub shafts 50 supported therefrom journaled in self centering bearing blocks 52 supported from the upper end portions of the arms 20, the shafts 50 having driven sprocket wheels 54 mounted thereon aligned with the drive sprockets 36. In addition, endless chains 56 are trained about the drive sprockets 36 and the sprocket wheels 54 whereby the latter are driven by the former.

Figure 5:
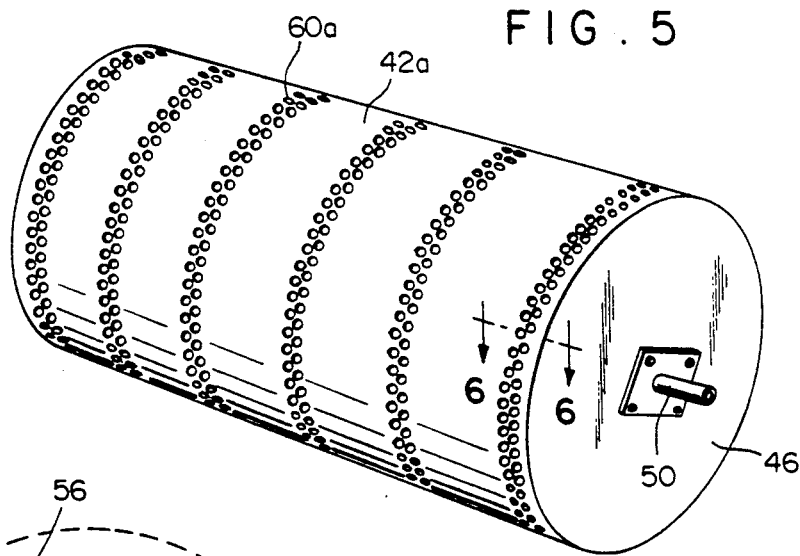
FIG. 5 is an enlarged perspective view of one of the drums of the seed drill.

The drums 42 include cylindrical side walls 58 having axially spaced circumferentially extending rows of seed distributing openings or apertures 60 formed therein. The drums 42 in FIG. 1 include single circumferential rows of openings 60 spaced longitudinally along the drums 42 and the drum 42a illustrated in FIG. 5 includes double circumferential rows of openings 60a formed therein. Accordingly, it may be seen that different arrangements of rows of openings may be provided in the drums. In addition, from FIG. 3 of the drawings it may be seen that each of the drums includes a wall section 58a thereof which is removable to expose a fill opening 62 by which seeds may be introduced into the interior of the drums 42.

The beam 14 includes, removably anchored relative to the horizontal flange 18 thereof, a plurality of link chain sections 64 each having an end removably secured to the horizontal flange 18 in alignment with a corresponding row of openings 60 in the drums 42. Each link chain section 64 is of sufficient length to have a major portion of the length thereof drag along the ground behind the seed drill 10 and the rear most link of each link chain section supports a large eye 66 therefrom, the ground engaged links of the link chain sections 64 serving to scratch up the ground surface upon which seeds have been disposed and each eye 66 serving to gather the ground supported seed and loose earth along the path of the associated link chain section 64 in order to form a reasonably homogeneous mixture of seed and loose soil along each row of planted seeds.

Figure 6:
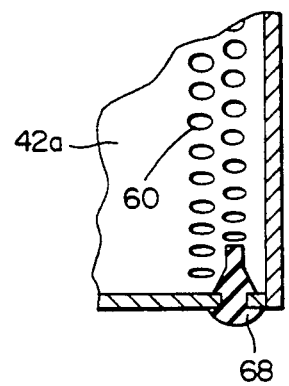
FIG. 6 is an enlarged fragmentary sectional view taken substantially upon the plane indicated by the section line 6—6 of FIG. 5.

As may be seen from FIG. 6 of the drawings, resilient plugs 68 are provided and may be removably anchored in selected openings 60 in order to eliminate selected openings 60 about the circumference of each drum through which each seed may be dispensed, if the amount of seed to be dispensed is to be reduced.

Figure 7:
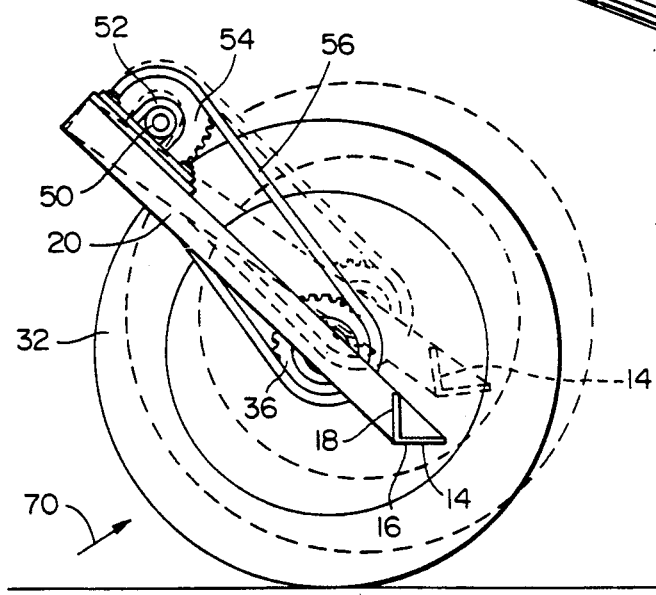
FIG. 7 is a top plan view of the rear end portion of one of the ground engaging link chains sections of the seeder.

With attention now invited more specifically to FIG. 6 of the drawings if one of the wheels 32, during forward movement of the seed drill 10, encounters a ground obstruction resulting an upward thrust being directed upon the wheel 32 in the direction of the arrow 70, it will be noted that very little vertical movement is imparted to the adjacent shaft 50 and the corresponding drum end. This is because the adjacent end of the beam 14 is displaced rearwardly and upwardly to the phantom line position thereof illustrated FIG. 7 while the beam 14 twists about its longitudinal axis relative to the opposite end of the beam 14. It is of course to be noted that the beam 14 is longitudinally torsional, but sufficiently rigid to withstand lateral deflection. Although the drum end adjacent the wheel 32 experiencing an upward thrusts is slightly upwardly displaced in the manner illustrated by phantom line in the upper left hand portion of FIG. 7, the adjacent ends of the drums 42 supported from the upstanding support 26 are upwardly displaced less than half the upward displacement of the stub shaft 50 illustrated by phantom lines in FIG. 7. Thus, shock loads of the drums 42 and their bearings is greatly reduced when the seed drill 10 moves over uneven ground.

Also, discounting the load of seed in the drums 42, the weight of the seed drill 10 is maintained at minimum, thereby enabling the seed drill to be pulled over uneven ground even by a relatively low powered four-wheel drive ATV. In addition, the link chain sections 64 offer little resistance to forward movement of the seed drill 10.

It is further pointed out that the drums 42 continuously tumble chaffy seeds therein in a manner such that such seeds may be separated from small stem sections which might obstruct the metering of seeds through the openings 60. Therefore, the seed drill 10 enables propagation of even extremely difficult species at a low cost since the harvesting of the seeds from a small acreage of a difficult species and the placement of the unprocessed harvested seed in the seed drill 10 is all that is required to enable even an inexperienced person to effectively proprogate difficult species.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wheeled agricultural implement specifically designed to move over rough ground, said implement including a single elongated, transverse beam having opposite ends, said beam being relatively longitudinally stiff against lateral deflection and including front and rear sides and hitch means for connection with a prime mover to move said beam laterally forwardly, first mounting means carried by opposite end portions of said beam journaling opposite side ground engaging support wheels therefrom for rotation about axes generally paralleling said beam, second mounting means carried by said opposite end portions of said beam supporting load supporting mounts therefrom with said load supporting mounts spaced forward of and above said axes, load supporting structure for said implement extending between and supported from said load supporting mounts, said beam being constructed for operational yieldingly resisted angular displacement of either end thereof relative to the other beam end about the longitudinal axis of said beam and the spacing of said load supporting mounts forward and above said axes being such that a sharp upward and rearward thrust on one of said wheels will result in rearward and upward displacement of the corresponding beam end about an axis paralleling said beam and passing through the corresponding load supporting mount and angular displacement of said corresponding beam end relative to said other beam end about said longitudinal axis of said beam.

2. The implement of claim 1 wherein said beam comprises an angle member.

3. The implement of claim 1 wherein said load supporting structure includes opposite side weight load structure sections extending along the length of said beam and spaced apart, longitudinally along said beam, adjacent the longitudinal mid-portion of said beam, said hitch including an elongated front-to-rear extending, generally horizontal hitch tongue including a rear end portion anchored relative to said longitudinal mid-portion and extending forwardly therefrom to a point spaced forward of said load supporting structure sections, said hitch tongue including an upright support structure mounted therefrom between said load supporting structure sections, the adjacent portions of said load supporting structure sections being mounted from an upper portion of said upright support structure and the remote portions of said load supporting structure sections being supported from said load supporting mounts.

4. The implement of claim 3 wherein said load supporting structure sections comprise axially aligned and spaced apart horizontal drums including remote ends journaled from said load supporting mounts and adjacent ends journaled from said upper portion of said upright support structure.

5. The implement of claim 1 wherein said axes are disposed forward of and above said beam.

6. The implement of claim 5 wherein said load supporting structure includes load supporting structure sections extending along the length of said beam and spaced apart, longitudinally along said beam, adjacent the longitudinal mid-portion of said beam, said hitch including an elongated front-to-rear extending, generally horizontal hitch tongue including a rear end portion anchored relative to said longitudinal mid-portion and extending forwardly therefrom to a point spaced forward of said load supporting structure sections, said hitch tongue including an upright support structure mounted therefrom between said weight load structure sections, the adjacent portions of said load supporting structure sections being mounted from an upper portion of said upright support structure and the remote portions of said load supporting structure sections being supported from said load supporting mounts.

7. The implement of claim 6 wherein said load supporting structure sections comprise axially aligned and spaced apart horizontal drums including remote ends journaled from said load supporting mounts and adjacent ends journaled from said upper portion of said upright support structure.

8. The implement of claim 6 wherein said drums include circumferentially extending, axially spaced rows of seed outlet openings.

9. The implement of claim 8 including a plurality of opening plugs removably, retentively anchored in selected openings in said rows of openings.

10. The implement of claim 1 wherein said second mounting means include forwardly and upwardly inclined arms from whose upper ends said load supporting mounts are supported.

11. The implement of claim 10 wherein said wheels are journaled from lower end portions of said arms.

12. The implement of claim 11 wherein said load supporting structure includes load supporting structure sections extending along the length of said beam and spaced apart, longitudinally of said beam, adjacent the longitudinal mid-portion of said beam, said hitch including an elongated front-to-rear extending, generally horizontal hitch tongue including a rear end portion anchored relative to said longitudinal mid-portion and extending forwardly therefrom to a point spaced forward of said load supporting structure sections, said hitch tongue including an upright support structure mounted therefrom between said load supporting structure sections, the adjacent portions of said load supporting structure sections being mounted from an upper portion of said upright support structure and the remote portions of said load supporting structure sections being supported from said load supporting mounts, said load supporting structure sections comprising axially aligned and spaced apart horizontal drums including remote ends journaled from said load supporting mounts and adjacent ends journaled from said upper portion of said upright support structure.

13. The implement of claim 12 including means drivingly connecting said wheels to the remote ends of said drums.

14. The implement of claim 8 including elongated link chain sections each including front and rear ends, said front ends being anchored relative to said beam in registry the rows of openings in said drums, the rear end portions of said link chain sections being disposed for dragging upon the ground over which said implement is drawn, the rear ends of said link chain sections including large open links supported therefrom.

* * * * *